(12) United States Patent
Johns et al.

(10) Patent No.: US 7,590,774 B2
(45) Date of Patent: Sep. 15, 2009

(54) METHOD AND SYSTEM FOR EFFICIENT CONTEXT SWAPPING

(75) Inventors: Charles Johns, Austin, TX (US); Peichun Liu, Austin, TX (US); Takashi Omizo, Irvine, CA (US)

(73) Assignees: Kabushiki Kaisha Toshiba, Tokyo (JP); International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/291,735

(22) Filed: Dec. 1, 2005

(65) Prior Publication Data

US 2007/0162640 A1    Jul. 12, 2007

(51) Int. Cl.
G06F 13/28 (2006.01)
G06F 7/38 (2006.01)
G06F 9/00 (2006.01)

(52) U.S. Cl. .......................... 710/22; 712/228; 713/100
(58) Field of Classification Search ................... 710/22, 710/23; 712/228; 716/1
See application file for complete search history.

(56) References Cited

U.S. PATENT DOCUMENTS

| | | | | |
|---|---|---|---|---|
| 4,402,044 A | * | 8/1983 | McDonough et al. | 716/1 |
| 5,361,362 A | * | 11/1994 | Benkeser et al. | 718/102 |
| 5,371,849 A | * | 12/1994 | Peaslee et al. | 345/553 |
| 5,428,779 A | * | 6/1995 | Allegrucci et al. | 718/108 |
| 6,061,711 A | * | 5/2000 | Song et al. | 718/108 |
| 6,101,599 A | * | 8/2000 | Wright et al. | 712/228 |
| 6,209,085 B1 | * | 3/2001 | Hammond et al. | 712/244 |
| 7,117,346 B2 | * | 10/2006 | Moyer et al. | 712/228 |
| 7,173,627 B2 | * | 2/2007 | Doyle et al. | 345/501 |
| 2006/0015876 A1 | * | 1/2006 | Day et al. | 718/108 |
| 2006/0026312 A1 | * | 2/2006 | Chauvel | 710/23 |
| 2007/0101108 A1 | * | 5/2007 | Grossman et al. | 712/228 |

FOREIGN PATENT DOCUMENTS

JP    1993028092 A    2/1993

* cited by examiner

*Primary Examiner*—Henry W. H. Tsai
*Assistant Examiner*—Michael Sun
(74) *Attorney, Agent, or Firm*—Sprinkle IP Law Group

(57) ABSTRACT

Systems and methods for efficiently switching context between processing elements are disclosed. These systems and methods may transfer the context of a processing element to a storage location. Using the DMA controller of a target processing element, the contents of this storage location may be transferred to another storage location associated with the target processing element. The context may then be restored from this storage location to the proper locations in the target processing element, and the target processing element may then begin processing utilizing this transferred context.

16 Claims, 5 Drawing Sheets

METHOD AND SYSTEM FOR EFFICIENT CONTEXT SWAPPING

TECHNICAL FIELD OF THE INVENTION

The invention relates in general to methods and systems for efficient context switching in a processor, and more particularly, to methods and systems for minimizing the overhead associated with context switching utilizing direct memory access.

BACKGROUND OF THE INVENTION

With the advent of the computer age, electronic systems have become a staple of modern life, and some may even deem them a necessity. Part and parcel with this spread of technology comes an ever greater drive for more functionality from these electronic systems. To accommodate this desire for increased functionality, these systems may employ high performance processors.

These high performance processors, in turn, are increasingly adding complex features to increase their performance. At the advent of the computer age operating systems were designed to run a single program sequentially. Thus, a single program would execute on a processor, after the conclusion of this program another program could be executed. Uniprogramming of this type eventually became stifling as users desired the ability to perform multiple tasks simultaneously. To circumvent the limitations of uniprogramming, tweaks such as memory-resident programs which could be invoked asynchronously were added to certain operating systems. These tweaks were somewhat problematic, however, as they introduced a wide variety of difficult bugs into the various programs, as most of these uniprogrammed operating systems lacked a significant amount of memory protection.

To alleviate these problems, and allow multiple processes to be active simultaneously, multiprogramming operating systems were designed. These multiprogramming operating systems allow multiple programs to share a single processor. In fact, in most cases this sharing is accomplished so seamlessly that it appears to a user that these multiple programs are executing simultaneously.

These multiprogrammed operating systems are based upon a fundamental concept that a point in the execution of a program is comprised at least partially of a state of a processor. This state, collectively known as the context, may comprise things such as the values of general purpose registers, the stack pointer, the floating point registers, any local store, memory mapped I/O registers, DMA context, etc. Consequently, by saving the state associated with a given instant of a program on a processor, the state can be restored at a later time and the execution of the program resumed. In the interim another program may be executed on the processor.

The ability to implement a multiprogrammed operating system is not without its detriments, however. In order to save the context from, and restore the context to, the processor the context itself must be stored for this intervening time span. In many cases this context is stored to the system stack in system memory, meaning, that every time the context of the processor is placed on the stack from the processor, or retrieved from the stack to be restored to the processor, the system memory must be accessed through the system bus. Accessing and utilizing the system bus to store context entails a large amount of time and overhead relative to the execution of programs on the processor.

Recently a new architecture has been developed for computer processors. Known as a multi-core architecture, this processor architecture is comprised of a core processor element and a number of auxiliary processor elements connected by an inter-chip bus. As may be imagined, in a processor architecture such as this many context switches may occur on a much more frequent basis then in a single processor chip, as context switching may occur with respect to not only the core processor element, but each of the auxiliary processor units as well.

As can be seen then, when accomplishing these context switches in conjunction with multiple auxiliary processor elements, multiple accesses to the system memory and the thus the system bus may be entailed. These repeated access to system memory through the system bus have a soporific effect on the system as a whole, as the time required to achieve these context switches is Brobdingnagian relative to the execution speed of the processor.

Thus, a need exists for efficient methods of context switching which substantially reduce the overhead of saving the context from, and restoring a context to, a processing element.

SUMMARY OF THE INVENTION

Systems and methods for efficiently switching context between processing elements are disclosed. These systems and methods may transfer the context of a processing element to a storage location. Using the DMA controller of a target processing element, the contents of this storage location may be transferred to another storage location associated with the target processing element. The context may then be restored from this storage location to the proper locations in the target processing element, and the target processing element may then begin processing utilizing this transferred context.

In one embodiment, a context is transferred from a storage location to another storage location using Direct Memory Access (DMA). The context can then be restored from this second storage location into a target processing element and the target processing element may begin processing using this context.

In some embodiments, the context may be transferred from a processing element to the storage location using DMA.

In other embodiments, a context maybe transferred from a storage location to an intermediary storage location using DMA. This context can then be transferred from the intermediary storage location to another storage location, also using DMA. The context can then be restored from this storage location into a target processing element and the target processing element may begin processing using this context.

Embodiments of the present invention may help to minimize the overhead associated with context switching between, among or within processor elements by allowing contexts to be transferred, at least in part, using DMA or dedicated hardware. Thus, a processing element may only have to be stopped for a relatively short period of time when performing a context swap.

Additionally, embodiments of the present invention offer the advantage that when used with certain multi-core processors they reduce the time taken to transfer a context between processors or memory locations by allowing an on-chip bus to be utilized, at least in part, for the transfer of these contexts.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. The term "processor element" is intended to mean any software, hardware or combination thereof which supports the execution of instructions.

Before describing embodiments of the present invention it may be useful to describe an exemplary architecture for a multi-core microprocessor which may be helpful in describing the aforementioned embodiments of the present invention. It will be apparent that though embodiments of the present invention may be particularly advantageous when utilized with embodiments of multi-core microprocessors, and thus embodiments of the present invention may be described in conjunction with exemplary embodiments of a multi-core microprocessor, embodiments of the present invention may also be used advantageously with single core microprocessors or in any other setting in which the transfer of the context of a processing element may be desired.

Figure 1:
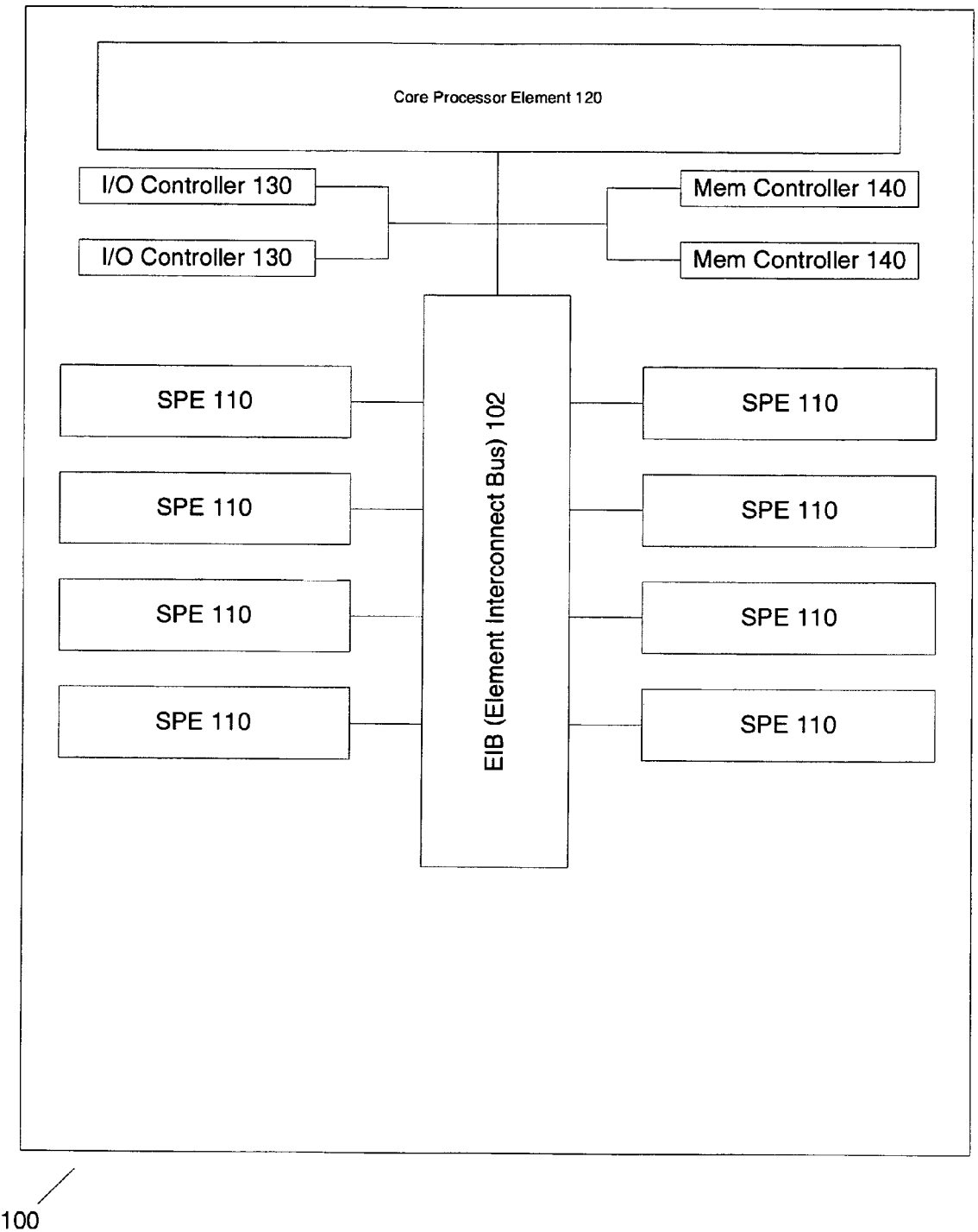
FIG. 1 depicts a block diagram of one embodiment of a multi-core architecture.

Turning to FIG. 1, a block diagram for one such exemplary embodiment of a multi-core microprocessor is depicted. Multi-core microprocessor 100 comprises core processor element 120, Input/Output (I/O) controllers 130, memory controllers 140, and synergistic processor elements (SPE) 110, all linked to one another via element interconnect bus (EIB) 102. Memory controllers 140 may be used to access system memory (not shown).

In one particular embodiment, core processor element 120 may be a 64-bit processor according to the IBM "Power Architecture" with a 32-KB first-level instruction and data caches and a 512-KB second-level cache. During operation of multi-core processor 100, core processor element 120 may run an operating system and some applications, however, certain parts of the operating system or certain applications, either in part or in whole, may be offloaded to SPEs 110 for execution. Each SPE 110 may comprise a self-contained vector processor capable of acting as an independent processor.

Figure 2:
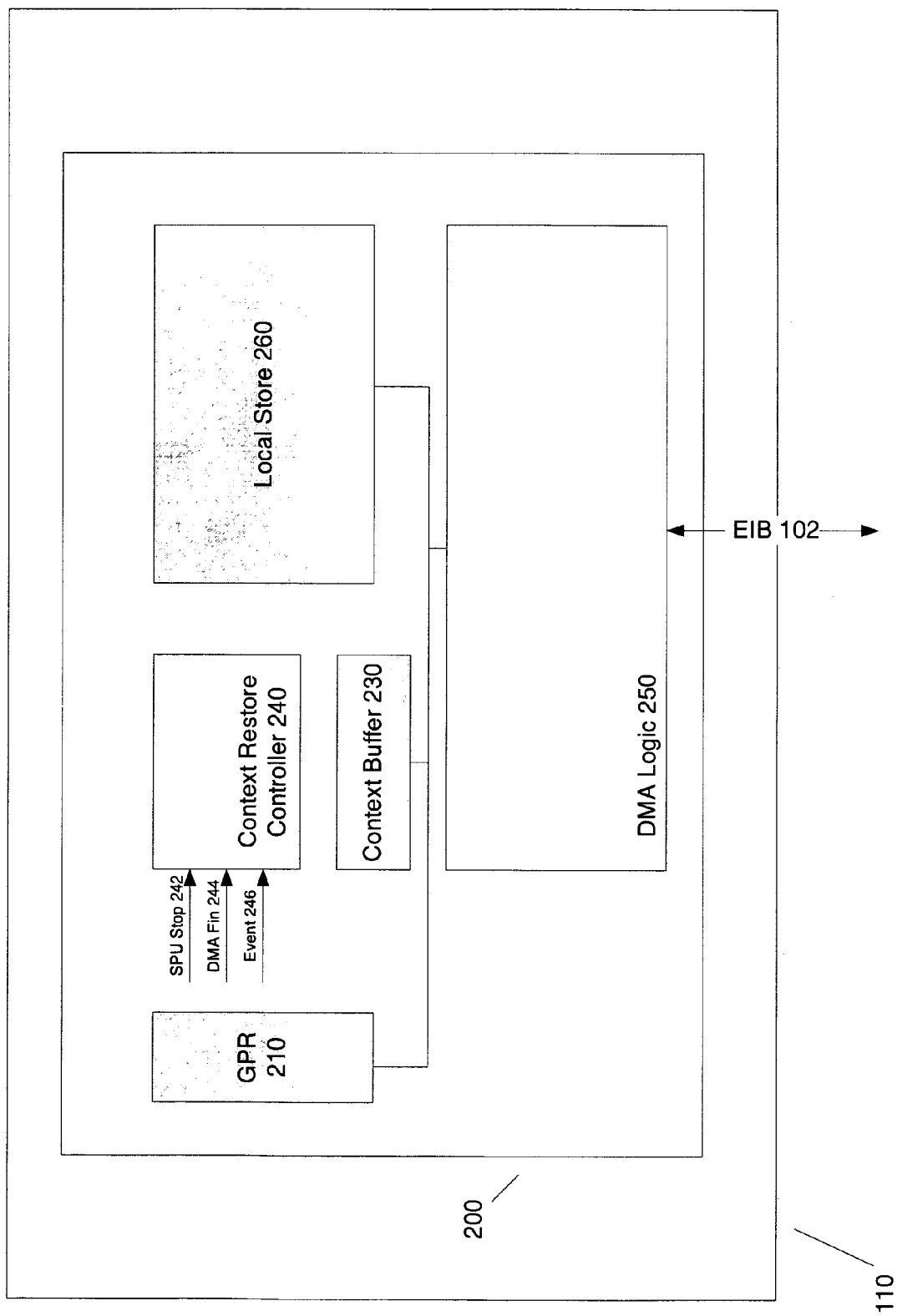
FIG. 2 depicts an block diagram of one embodiment of a synergistic processor element.

Moving to FIG. 2, a block diagram of one embodiment of an architecture of the core of an SPE 110 is depicted. Core 200 of SPE 110 comprises a set of general purpose registers 210, context buffer 230, context restore controller 240, direct memory access (DMA) logic 250, which may include a memory management unit and a memory mapped I/O register among other logic, and local store 260. Context buffer 230 may, in some embodiments, be dedicated memory on core 200, in other embodiments context buffer 230 may be a portion of local store 260 while in still other embodiments context buffer 230 may not reside on core 200 of SPE 110. In one embodiment, SPC context buffer 230 is mapped on the address space of system 100 such that context buffer 230 can be seen as part of the address range by DMA devices, and may be operable to store multiple contexts in a queue.

Context restore controller 240 may be operable to restore a context into an SPE 110 and may have three signal lines: SPE stop 242 which may be asserted when the SPC core 200 has stopped executing a thread or process, for example because of a timing interrupt or an exception, and deasserted when the SPU is executing a thread or process; DMA finish 244 which may be asserted when a DMA operation has completed and deasserted when a DMA operation is taking place, and an event signal 246 which may be asserted by software running on the core processor 120 or any SPE 110 when a software application wishes to force SPE 110 to undergo a context switch. Context restore controller 240 may be programmable, and may be programmed with this functionality, or other functionality, by an operating system executing on multi-core processor 100.

SPE 110 is capable of asynchronous DMA transfers between local store 260 and system memory (not shown) and between local stores on SPEs 110 using DMA logic 250 coupled to EIB 102. Such DMA transfers may be initiated from instructions executing on core processor element 120 or an SPE 110. DMA transfers can be programmed with instructions on SPE 110 that insert DMA commands in a queue of commands associated with DMA logic 250 or by inserting commands in the DMA queue from another processor element 110, 120 in the system by using store or write commands. For programming convenience, and to allow local-store to local-store DMA transactions, local-store 260 may be mapped into the memory map of core processor 120.

Allowing such asynchronous transfers offers the advantages of parallel computation and transfer of data and/or instructions. These advantages may be utilized to allow a context to be transferred between or among SPEs 110 or between core processor 120 and an SPE 110, while the SPE(s) 110 involved continue to process data. Allowing contexts to be transferred in parallel with processing may help alleviate some of the overhead associated with such context switches.

Attention is now directed to systems and methods for efficiently switching context between processing elements. These systems and methods may transfer the context of a processing element to a storage location. Using the DMA controller of a target processing element, the contents of this storage location may be transferred to another storage location associated with the target processing element. The context may then be restored from this storage location to the proper locations in the target processing element, and the target processing element may then begin processing utilizing this transferred context.

Figure 3:
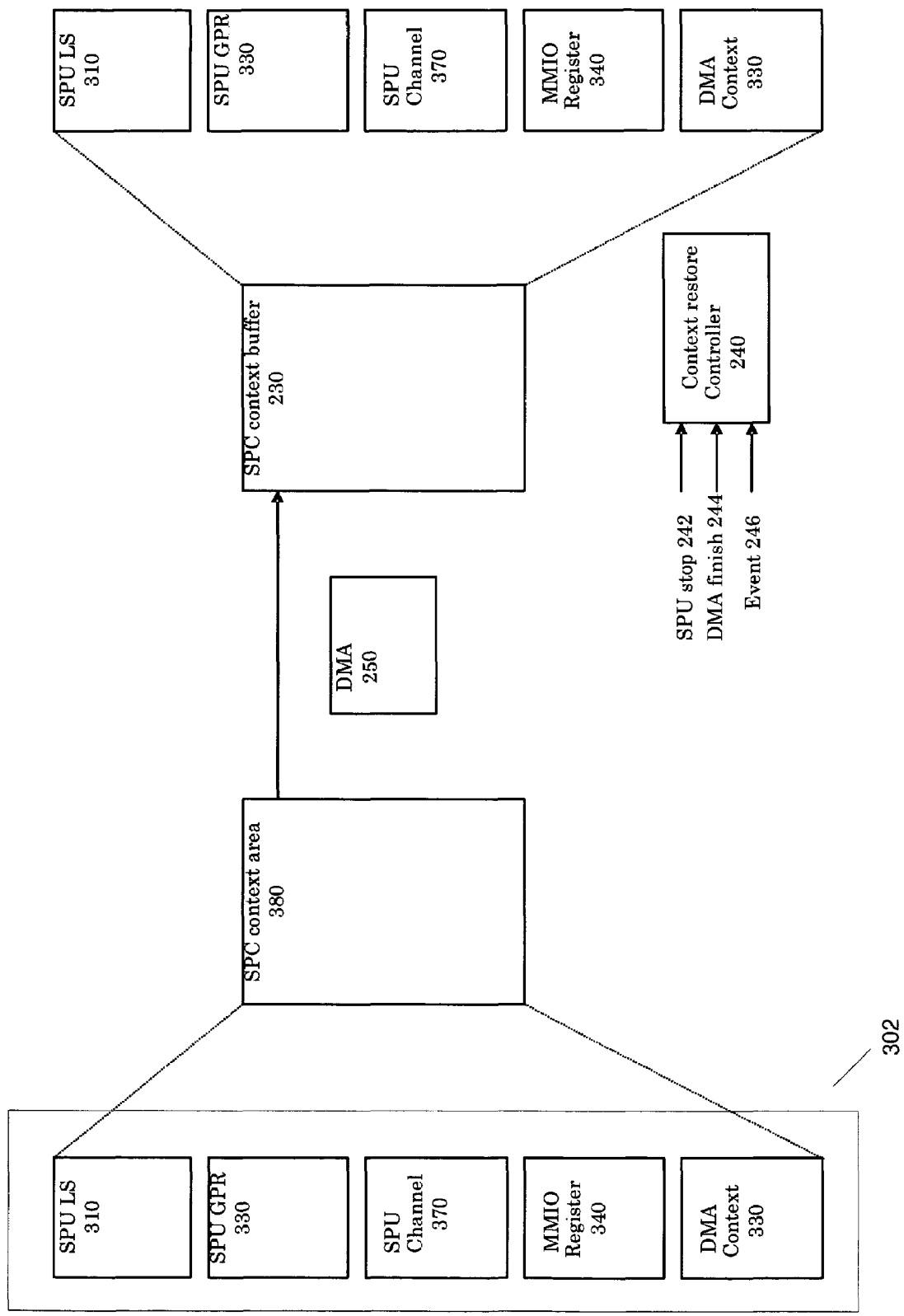
FIG. 3 depicts an illustration of one embodiment of transferring context between processor elements.

FIG. 3 depicts a block diagram of the operation of one embodiment of the systems and methods of the present invention. The context 302 of an SPE 110 comprises the values of various resources utilized by an SPE 110 during execution of a process. These resources may include the value 310 of general purpose registers 210, values 330 associated with direct memory access (DMA) logic 250, which may include values associated with the memory management unit and values 340 associated with a memory mapped I/O register among other logic, values 360 of local store 260 and values 370 associated with one or more SPU channels. It will be apparent that context 302 may encompass a greater or fewer number of the resources of SPE 110 depending on the particular embodiment of the present invention implemented.

At some point it may be desirable to change the process being executed by an SPE 110 by performing a context swap on the SPE 110. In order to accomplish this, context 302 of the currently executing process may need to be saved so that context 302 may be transferred and restored (either back into the same SPE 110 or into another SPE 110) at a later time.

To preserve context 302, context 302 may be transferred into SPC context area 380. SPC context area 380 may be an area in the system memory map such that SPC context area 380 appears as a sequential address range from the point of view of DMA logic 250. This particular range of addresses may be associated with SPE 110 such that only context 302 of that SPE 110 may be written to SPC context area 380 and each SPE 110 has its own particular SPC context area 380. SPC context area 380 may alternatively be an area of local store 260.

No matter the location of SPC context area 380, context 302 of SPE 110 may be transferred to SPC context area 380. The transfer of context 302 of SPE 110 to SPC context area 380 may be initiated by software running on either the core processor element 120 or on an SPE 110. Additionally, this transfer may be initiated at regular intervals, such that at these regular intervals the SPC context area 380 is overwritten with the then current context 302 of the SPE 110. Whether initiated at regular intervals, or on an ad hoc basis by software on SPE 110 or remote from SPE 110, context 302 may be transferred to SPC context area 380 through the use of DMA logic 250 if SPC context area 380 resides in the system's memory map. In one embodiment, initiation of the transfer of context 302 to SPC context area 380 is done through the use of a DMA command issued to DMA logic 250 which is a write command indicating that DMA logic 250 should write context 302 to the address(es) of SPC context area 380. The transfer of context 302 to SPC context area 380 may also be accomplished using memory mapped I/O.

At some point after transferring context 302, DMA logic 250 on a target SPE 110 (which may be the same SPE 110 from which context 302 was originally gleaned or a different SPE 110) may receive a command to transfer context 302 from SPC context area 380 to SPC context buffer 230 on the target SPE 110. This DMA transfer from SPC context area 380 to SPC context buffer 230 on the target SPE 110 may be initiated by software running on core processor element 120 or on any SPE 110 and may comprise a DMA write command with SPC context area 380 as the source and SPC context buffer 230, or an area of SPC context buffer 230, as the destination. The contents of SPC context area 380 are then transferred to SPC context buffer 230 on the target SPE 110 utilizing DMA logic 250 on target SPE 110. Subsequent to, or before, the completion of the context transfer, context restore controller 240 may detect a condition which triggers a context restore. In cases where such a condition is detected before the completion of the context transfer, context restore controller 240 may have to wait to restore context 302 to SPE 110 until the transfer of context 302 is completed.

In one embodiment, upon completion of the transfer of context 302 to SPC context buffer 230 from SPC context area 380, DMA logic 250 may assert DMA finish signal 244 coupled to context restore controller 240 on the target SPE 110. Upon assertion of either SPU stop signal 242 or event signal 246 (each of which may have been asserted before the assertion of DMA finish signal or which may subsequently be asserted) context restore controller 240 may copy or restore the values of context 302 resident in SPC context buffer 230 to their corresponding locations associated with the various resources utilized by an SPE 110 during execution of a process. In one particular embodiment, as SPC context buffer 230 may be a queue of contexts, when resorting a context 302 from context buffer 230 context restore controller 240 may copy or restore the values of the context 302 at the top of the queue of contexts in context restore buffer 230. As mentioned above, these values may include the values 310 of general purpose registers 210, values 330 associated with direct memory access (DMA) logic 250, which may include values associated with the memory management unit and values 340 associated with a memory mapped I/O register among other logic, values 360 of local store 260 and values 370 associated with one or more SPU channels.

After restoring context 302 to SPE 110, context restore controller may start SPE 110 such that SPE 110 may begin processing using context 302. In this manner, a context may be transferred from an SPE 110 to a storage location using DMA, transferred from this storage location to the same or a different SPE 110 using DMA, and restored such that an SPE 110 may begin processing using the context.

Occasionally, when transferring context 302 from an SPE 110 to SPC context area 380 it may be determined that SPC context buffer 230 of the target SPE 110 contains one or more contexts which have not yet been restored into the target SPE 110 (context buffer 230 is full). This status of SPC context buffer 230 may be kept either in hardware or software. For example, a portion of an operating system responsible for scheduling may have a table with one or more bits associated with each SPC context buffer 230 with the status of the bits depending on the status of the data in SPC context buffer 380. Alternatively, one or more bits in a register of SPE 110 may be associated with SPC context buffer 230 of the SPE 110, with the status of the bits depending on the status of the data in SPC context buffer 230. Thus, by referencing the status of SPC context buffer 230 an initiator can determine if the SPC context buffer 230 associated with the SPE 110 to which a transfer is to be initiated is full.

Figure 4:
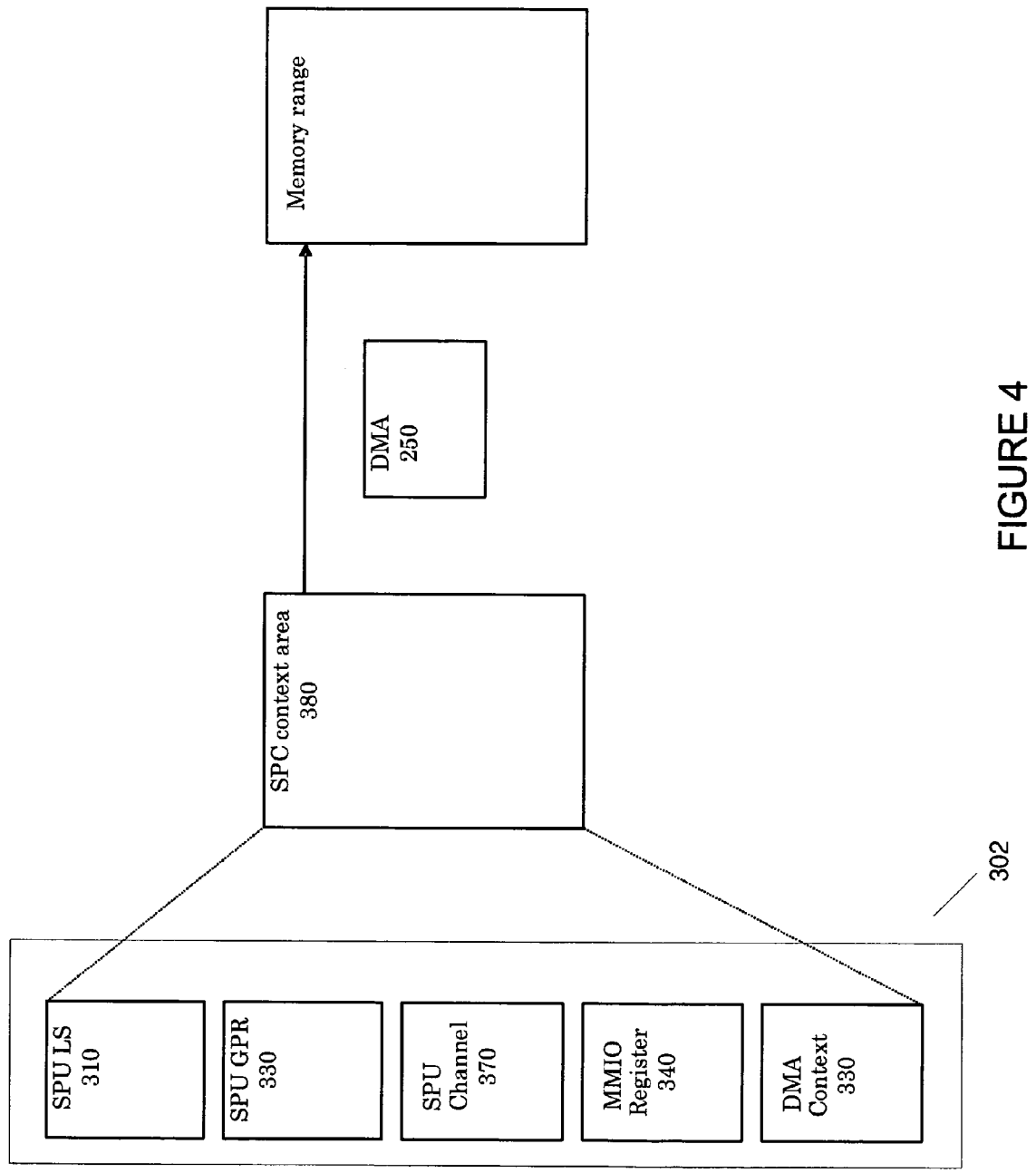
FIG. 4 depicts an illustration of one embodiment of transferring context from a processor element to a memory.

In cases where the initiator determines that SPC context buffer 230 associated with an SPE 110 is full the context of the SPE 110 may be transferred to another storage location. FIG. 4 depicts a block diagram of the operation of one embodiment of transferring a context to a memory range. In this embodiment, 302 may be transferred into a storage area comprising range of memory addresses 410 of system memory.

The transfer of context 302 of SPE 110 to memory range 410 may be initiated by software in either the core processor element 120 or in the SPE 110. The initiator may determine that SPC context buffer 230 associated with SPE 110 is full and determine a range of memory addresses 410. The initiator may then issue a command to DMA logic 250 on SPE 110 which is a write command indicating that DMA logic 250 should transfer context 302 to range of memory addresses 410. DMA logic 250 may then transfer context 302 to the memory addressed by range of memory addresses 410.

Figure 5:
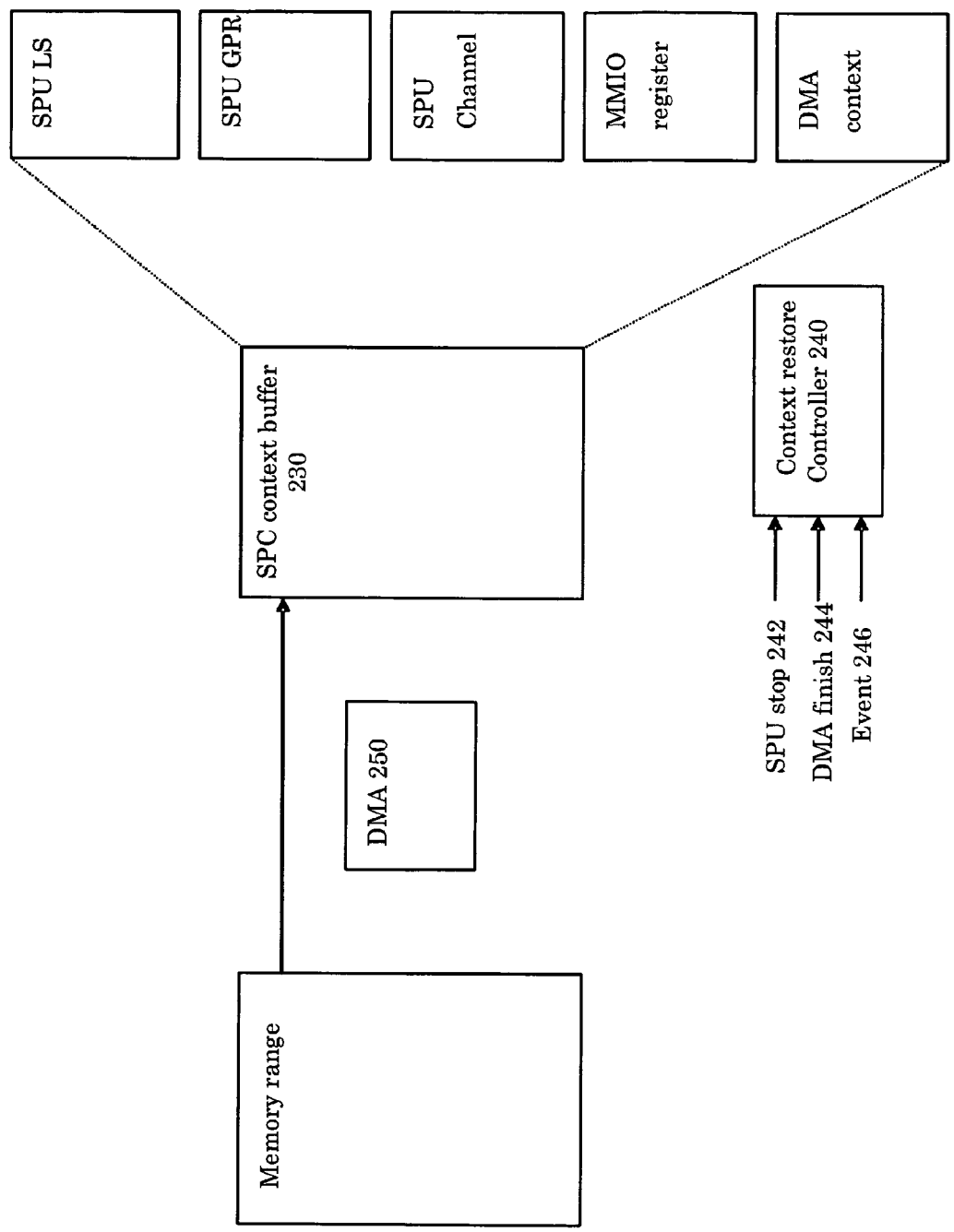
FIG. 5 depicts an illustration of one embodiment of transferring a context from a memory to a processor element.

At some later point it may be desirable to restore this context saved in the memory addressed by range of memory addresses 410 into an SPE 110. FIG. 5 depicts a block diagram of the operation of one embodiment of transferring context 302 from memory range 410 to an SPE 110. DMA logic 250 of target SPE 110 (which may be the same SPE 110 from which context 302 was originally gleaned or a different SPE 110) may receive a command to transfer context 302 from memory associated with range of memory addresses 410 to SPC context buffer 230 on target SPE 110. This DMA transfer from range of memory addresses 410 to SPC context buffer 230 on the target SPE 110 may be initiated by software in either the core processor element 120 or in any SPE 110 and may comprise a DMA write command with range of memory addresses 410 as the source and SPC context buffer 230 as the destination. The contents of range of memory addresses 410 are then transferred to SPC context buffer 230 on the target SPE 110 utilizing DMA logic 250 on target SPE 110. Context restore controller 240 may then detect a condition which triggers a context restore, restore the context 302 from the SPC context buffer and start SPE 110 so that SPE 110 may begin processing using context 302.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for transferring context between processing elements, comprising:
    transferring a context from a first storage location to a second storage location using first Direct Memory Access (DMA) logic of a first processing element, wherein the first storage location is in the first processing element of a multi-core microprocessor having a plurality of substantially identical processing elements and the context is configured to be executed by any of the plurality of processing elements, wherein the second storage location is a context area accessible by the second processing element and the transfer from the first storage location to the context area associated with the second processing element is done asynchronously to the operation of the second processing element;
    transferring the context from the second storage location into a context buffer of a second processing element of the multi-core processor using second Direct Memory Access (DMA) logic of the second processing element, wherein the transfer of context from the second storage location into the context buffer is done asynchronously to the operation of the first processing element;
    receiving a DMA finish signal from the second DMA logic at a context restore controller of the second processing element when the second DMA logic completes the transfer of context from the second storage location into the context buffer;
    receiving a second signal at the context controller; and
    in response to the DMA finish signal and the second signal, restoring the context from the context buffer of the second processing element such that the second processing element can process using the context.

2. The method of claim 1, wherein the first storage location is a location in system memory.

3. The method of claim 2, wherein the first storage location comprises a set of sequential addresses.

4. The method of claim 3, wherein restoring the context is accomplished by a context restore controller.

5. The method of claim 3, further comprising processing using the second processing element and the context.

6. The method of claim 1, wherein the buffer is operable to store a queue of contexts.

7. The method of claim 6, wherein restoring the context is accomplished by a context restore controller.

8. The method of claim 6, further comprising processing using the second processing element and the context.

9. A method for transferring context between processing elements, comprising:
    transferring a context from a first storage location to a second storage location using first Direct Memory Access (DMA) logic of a first processing element, wherein the first storage location is in the first processing element of a multi-core microprocessor having a plurality of substantially identical processing elements and the context is configured to be executed by any of the plurality of processing elements, wherein the second storage location is a context area accessible by the second processing element and the transfer from the first storage location to the context area associated with the second processing element is done asynchronously to the operation of the second processing element;
    transferring the context from the second storage location to a third storage location, wherein the third storage location comprises a context buffer of a second processing element of the multi-core processor using second Direct Memory Access (DMA) logic of the second processing element, wherein the transfer of context from the second storage location into the context buffer is done asynchronously to the operation of the first processing element;
    receiving a DMA finish signal from the second DMA logic at a context restore controller of the second processing element when the second DMA logic completes the transfer of context from the second storage location into the context buffer;
    receiving a second signal at the context controller; and
    in response to the DMA finish signal and the second signal, restoring the context from the context buffer of the second processing element of the multi-core processor such that the second processing element can process using the context.

10. The method of claim 9, wherein the first storage location comprises a set of sequential addresses.

11. The method of claim 9, wherein the context buffer is operable to store a queue of contexts.

12. A system for transferring context between processing elements, comprising:

a multi-core microprocessor having a plurality of substantially identical processing elements;

a first processing element of the plurality of substantially identical processing elements having first Direct Memory Access (DMA) logic;

a first storage location operable to store a context of the first processing element transferred from the first processing element using the first DMA logic, wherein the first storage location is an area of system memory and the context is configured to be executed by any of the plurality of processing elements wherein the first storage location is a context area accessible by the second processing element and the transfer to the context area can be done asynchronously to the operation of the second processing element using the first DMA logic;

a second processing element of the plurality of substantially identical processing elements having second Direct Memory Access (DMA) logic and a context restore controller;

a second storage location associated with the second processing element operable to store the context, wherein the second location is the context buffer corresponding to the second processing element and the context can be transferred from the first storage location to the context buffer of the second processing element using the second DMA logic, wherein the transfer of the context from the second storage location into the context buffer can be done asynchronously to the operation of the first processing element; and the context restore controller of the second processing element is operable, in response to a DMA finish signal from the second DMA logic indicating the completion of the transfer of the context and one or more second signals, to restore the context from the context buffer of the second processing element such that the second processing element can process using the context.

13. The system of claim 12, wherein the first storage location comprises a set of sequential addresses.

14. The system of claim 13, wherein the context buffer is operable to store a queue of contexts.

15. A system for transferring context between processing elements, comprising:

a multi-core microprocessor having a plurality of substantially identical processing elements;

a first processing element of the plurality of substantially identical processing elements having first Direct Memory Access (DMA) logic;

a first storage location operable to store a context of a first processing element, wherein the first storage location is in the first processing element of the multi-core microprocessor having a plurality of substantially identical processing elements and the context is configured to be executed by any of the plurality of processing elements;

a second processing element of the plurality of substantially identical processing elements having second Direct Memory Access (DMA) logic;

a second storage location operable to store the context, wherein the second storage location is a context area accessible by the second processing element and the transfer from the first storage location to the context area associated with the second processing element can be done asynchronously to the operation of the second processing element using the first DMA logic;

a third storage location associated with the second processing element operable to store the context wherein the third location is a context buffer corresponding to the second processing element and the context can be transferred from the second storage location to the context buffer of the second processing element using the second DMA logic and wherein the transfer of the context from the second storage location into the context buffer can be done asynchronously to the operation of the first processing element; and the second processing element further comprising a context restore controller operable, in response to a DMA finish signal indicating the completion of the transfer of the context from the second DMA logic and one or more second signals, to restore the context from the context buffer of the second processing element such that the second processing element can process using the context.

16. The system of claim 15, wherein the context buffer is operable to store a queue of contexts.

* * * * *

UNITED STATES PATENT AND TRADEMARK OFFICE
CERTIFICATE OF CORRECTION

PATENT NO. : 7,590,774 B2  Page 1 of 1
APPLICATION NO. : 11/291735
DATED : September 15, 2009
INVENTOR(S) : Johns et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this

Twenty-first Day of September, 2010

David J. Kappos
*Director of the United States Patent and Trademark Office*